(12) United States Patent
Reddy

(10) Patent No.: US 11,052,286 B2
(45) Date of Patent: Jul. 6, 2021

(54) SMART PERFORMANCE FOOTWEAR AND SYSTEM

(71) Applicant: Enterprise Engineering Designs, LLC, El Segundo, CA (US)

(72) Inventor: Aswin Reddy, El Segundo, CA (US)

(73) Assignee: Enterprise Engineering Designs, LLC, El Segundo, CA (US)

( * ) Notice: Subject to any disclaimer, the term of this patent is extended or adjusted under 35 U.S.C. 154(b) by 418 days.

(21) Appl. No.: 15/842,667

(22) Filed: Dec. 14, 2017

(65) Prior Publication Data

US 2018/0169474 A1    Jun. 21, 2018

Related U.S. Application Data

(60) Provisional application No. 62/435,018, filed on Dec. 15, 2016.

(51) Int. Cl.
| | |
|---|---|
| *A63B 24/00* | (2006.01) |
| *A43B 3/00* | (2006.01) |
| *G09B 5/06* | (2006.01) |
| *G09B 19/00* | (2006.01) |
| *A63F 13/212* | (2014.01) |
| *A43B 5/00* | (2006.01) |

(52) U.S. Cl.
CPC ........ *A63B 24/0062* (2013.01); *A43B 3/0021* (2013.01); *A63B 24/0006* (2013.01); *G09B 5/06* (2013.01); *G09B 19/0038* (2013.01); *A43B 3/0005* (2013.01); *A43B 5/00* (2013.01); *A63B 2024/0012* (2013.01); *A63B 2220/17* (2013.01); *A63B 2220/20* (2013.01); *A63B 2220/40* (2013.01); *A63B 2220/56* (2013.01); *A63B 2220/803* (2013.01); *A63B 2220/806* (2013.01); *A63B 2220/836* (2013.01); *A63B 2225/50* (2013.01); *A63B 2230/01* (2013.01); *A63F 13/212* (2014.09)

(58) Field of Classification Search
CPC ..... A43B 3/00; A43B 3/0021; A63B 24/0062; A63F 13/21; G01C 21/12
USPC ......................................................... 36/132
See application file for complete search history.

(56) References Cited

U.S. PATENT DOCUMENTS

| | | | | |
|---|---|---|---|---|
| 4,651,446 | A * | 3/1987 | Yukawa | ................... A43B 3/00 235/105 |
| 5,033,013 | A * | 7/1991 | Kato | ................... A43B 1/0054 235/105 |
| 9,311,827 | B1 * | 4/2016 | Alqahtani | ............ G09B 21/007 |

(Continued)

*Primary Examiner* — Timothy K Trieu
(74) *Attorney, Agent, or Firm* — Jeffer Mangels; Butler & Mitchell LLP; Brennan C. Swain, Esq.

(57) ABSTRACT

A footwear system that includes a left having a left toe region, left forefoot region, a left arch region and a left heel region, a left outsole, a left upper secured to the left outsole, and a left sensor system that includes at least a first left heel pressure sensor positioned in the left heel region, and at least a first left forefoot pressure sensor positioned in the left forefoot region. The footwear system also includes a right shoe that includes a right toe region, a right forefoot region, a right arch region and a right heel region, a right outsole, a right upper secured to the right outsole, and a right sensor system that includes at least a first right heel pressure sensor positioned in the right heel region, and at least a first right forefoot pressure sensor positioned in the right forefoot region.

3 Claims, 13 Drawing Sheets

(56) References Cited

U.S. PATENT DOCUMENTS

2012/0291563 A1\* 11/2012 Schrock ............... A61B 5/1038
                                                        73/862.041
2016/0146609 A1\* 5/2016 Ma ....................... G01C 21/165
                                                        701/533

\* cited by examiner

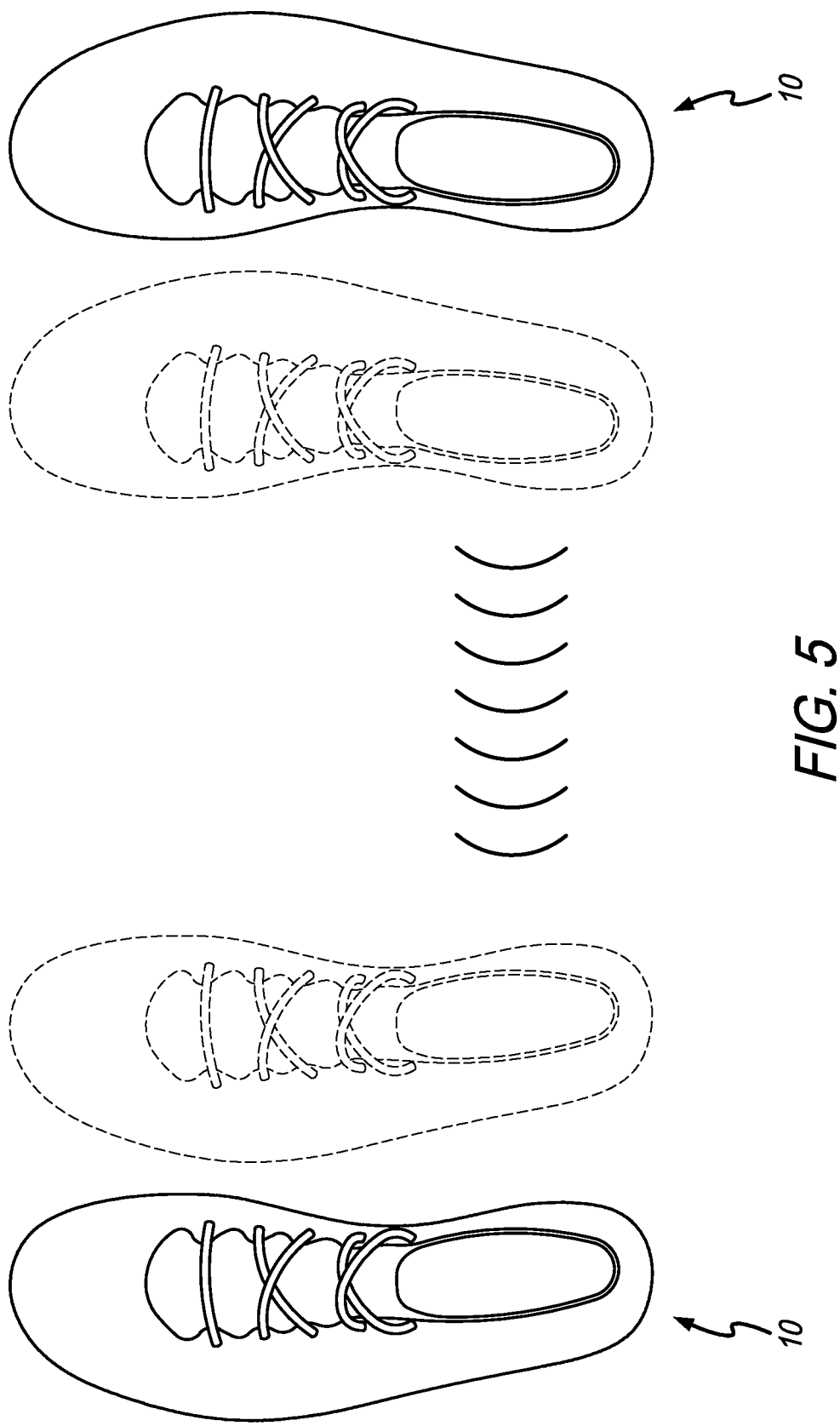

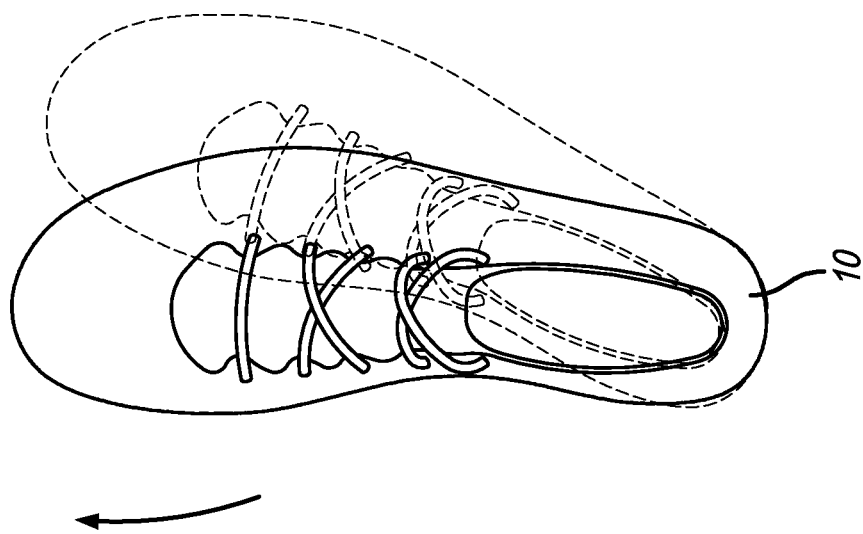
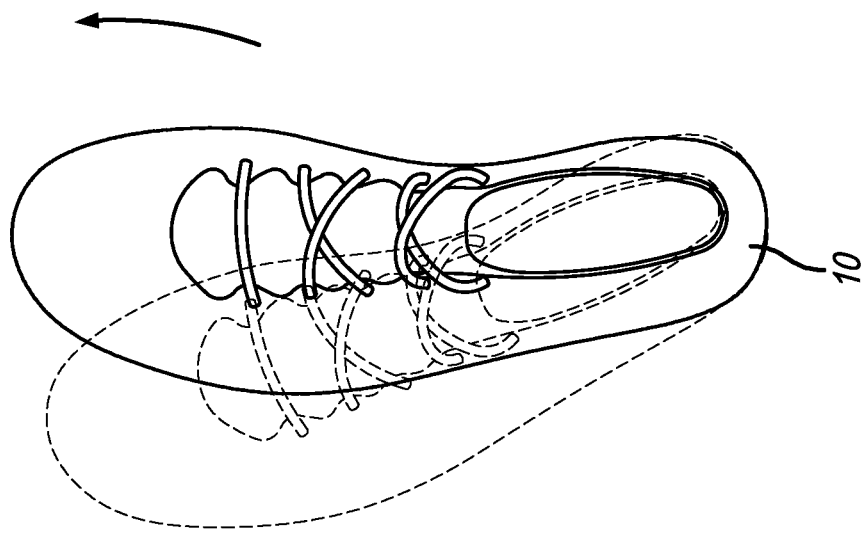
FIG. 6

SMART PERFORMANCE FOOTWEAR AND SYSTEM

CROSS REFERENCE TO RELATED APPLICATIONS

This application claims the benefit of U.S. Provisional Application No. 62/435,018, filed Dec. 15, 2016, the entirety of which is incorporated by reference herein.

FIELD OF THE INVENTION

The present invention relates generally to footwear that allows monitoring of a wearer's workout or movements, as well as a system related thereto.

BACKGROUND OF THE INVENTION

Physical fitness is a regular part of many people's lives. However, improper form during physical activity often leads to injuries. Accordingly, the ability to monitor a user's form through their footwear is advantageous. Such a monitoring system can also provide improved feedback and performance.

SUMMARY OF THE PREFERRED EMBODIMENTS

In accordance with a first aspect of the present invention there is provided a footwear system that includes a left having a left toe region, left forefoot region, a left arch region and a left heel region, a left outsole, a left upper secured to the left outsole, and a left sensor system that includes at least a first left heel pressure sensor positioned in the left heel region, and at least a first left forefoot pressure sensor positioned in the left forefoot region. The footwear system also includes a right shoe that includes a right toe region, a right forefoot region, a right arch region and a right heel region, a right outsole, a right upper secured to the right outsole, and a right sensor system that includes at least a first right heel pressure sensor positioned in the right heel region, and at least a first right forefoot pressure sensor positioned in the right forefoot region. In a preferred embodiment, the left shoe includes a left medial side and a left lateral side and the right shoe includes a right medial side and a right lateral side. A distance sensor is positioned on at least one of the left or right medial sides. Preferably, at least one of the left or the right shoe includes a wireless communication device that is configured to wirelessly communicate data from one or both of the left and right sensor systems.

In a preferred embodiment, at least one of the left or right shoe includes a notification component that provides at least one of vibration or an audible sound. Preferably, the left sensor system includes a left motion sensor, and the right sensor system includes a right motion sensor. In a preferred embodiment, at least one of the left or the right shoe includes an electronics assembly that comprises the wireless communication device and a memory unit. Preferably, the first left heel pressure sensor and the first left forefoot pressure sensor are mounted on a left sensor assembly that is positioned between a left insole and the left outsole, and the first right heel pressure sensor and the first right forefoot pressure sensor are mounted on a right sensor assembly that is positioned between a right insole and the right outsole.

In accordance with another aspect of the present invention, there is provided an article of footwear that includes an outsole, an upper secured to the outsole, a sensor system and a wireless communication device, The shoe includes a toe region, forefoot region, an arch region, a heel region, a medial region and a lateral region. The sensor system includes a first pressure sensor positioned in the heel region, a second pressure sensor positioned in the toe region and a third pressure sensor positioned in the lateral region. The sensor system also includes a motion sensor. The shoe includes a medial side and a lateral side and a distance sensor is positioned on the medial side. The wireless communications device is in communication with the sensor system and is configured to communicate data received from the sensor system.

In accordance with another aspect of the present invention, there is provided a system for monitoring a user workout that includes a software application executable on a user mobile device in communication with the server, a database, and a shoe that includes a sensor system and a wireless communication device. The wireless communication device is configured to communicate exercise performance data from the sensor system to the software application on the user mobile device. In a preferred embodiment, the shoe includes a toe region, a forefoot region, an arch region and a heel region, and the sensor system includes at least a first pressure sensor positioned in one of the toe region, forefoot region, arch region or heel region.

In a preferred embodiment, the database includes data regarding proper exercise performance data for at least a first exercise. Preferably, the software application is configured to provide a notification if the exercise performance data received from the sensor system is not proper when compared to the exercise performance data for the first exercise. The notification can be can be communicated by the shoe, the user mobile device or both. It will be appreciated by those of ordinary skill in the art that the database and the proper exercise performance data can reside on the user mobile device, a remote server or both. If it is on the user mobile device the user can exercise in an area without any connection to the external server (e.g., Wi-Fi or cellular data). In short, the system works in any situation where the sensor system can communicate the exercise performance data to a database that includes data about the proper form, the data can be compared to determine if the form is proper, and the user can be notified (via the notification component in the user mobile device or the shoe(s)) if the form is improper (or proper). Generally, the present invention provides the ability to monitor a user's workout and notify them via a software application (residing on a server or user mobile device) if they have improper form. The improper form can be determined by a sensor system in their footwear or by one or more cameras that are imaging the workout. A notification can then be provided to the user (via the app or the shoe(s)) when they are performing an exercise improperly. The camera system can include software that analyzes the form and provides the notification. In another embodiment, the images captured by the camera system can be monitored by a person who makes the determination of improper form. The sensor system can also include sensors placed on other parts of the user's body, such as their back, arms, hands, legs, head, etc. All of the components, modules or sensors in the sensor system communicate to the app whether form is proper or improper. Furthermore, the app can provide information on how to correct and use the proper form.

The present invention includes a performance shoe incorporating a sensor array or system for collecting and relaying data relating to fitness activities, and a system for communicating the data to a smartphone app with a user-friendly graphical interface.

In a preferred embodiment, inventive insole foot wearable helps people in both the sports and medical world with staying active the proper way; improving fitness goals, measuring activity levels, preventing injury, and getting meaningful feedback on progress. In a preferred embodiment, the invention is designed to work with a CrossFit like market in order to give users meaningful feedback of their workout. Monitoring stance, foot positing, weight distribution to determine good versus bad form for each type of workout. The preferred application can be a CrossFit like or weight lifting specific workout; however it can be used by runners as well or can be integrated with other workout platforms.

Preferably, embodiments of the invention include a range of models with add on modules to fit individual needs (described further below). It will be appreciated by those of ordinary skill in the art that the present invention is a shoe and sole device that works together with a system to measure the entire body to help with fitness progress and improve on bad form.

The preferred embodiments provide the following features: Selection of known workouts, receiving workouts from the user's coach/friend, and creating and modifying work outs to fit the user's needs. Reading the user's statistics, sharing the user's statistics, and getting back actionable alerts to improve the user's workout based on the data gathering to prevent injury and improve. Using a known database of proper motion patterns to make sure the user is correctly doing the motions of a workout. Having one or both of a real coach or an iPhone (or other portable electronic device) software alert that notifies the user when the user is incorrectly doing something that will lead to bad form or injury. Learning new motion and balance patterns or routines for new types of workout, or customizing the routines based on user limited physical abilities. Using the motions and patterns to dynamically determine what type of movement the user is doing to keep count of that motion. Example: running, jumping, spinning, sitting, to balance loading heavy weight above the user's head. Knowing the difference between each motion in order to keep track of good and bad reps, and then switch to a new motion to keep track of it while keeping track of the entire workout.

In further preferred embodiments, software support for iPad and Apple TV for class mode to monitor the entire class in real time can be added to the inventive system. In addition to a CrossFit like program, the inventive system can be used with other activities, such as in football to measure impact to the entire body, soccer, dancing, golfing, boxing, hockey, skiing, snowboarding, etc. In other embodiments the system can include a video game interface, service worker monitoring for work related injuries, and can be used in the medical market for patient monitoring.

In preferred embodiments of the invention, and with respect to a CrossFit like program, the following are components of the invention, alone and in combination. Smart contact/pressure sensors, that measure weight (e.g., between 1 and 7,000 lbs.). Preferably more than four sensors, and possibly more than eight contact sensors to receive meaningful reads across the bottom surface of the foot. The footwear can include one or more motion sensors to calculate step count. The pressure sensors can be used to accurately get step count plus weight, which can be combined with motion to determine the specific type of movement. One or more distance sensors can also be used to determine the distance between the two shoes. Knowing the distance between the shoes provides information related to stance, foot positioning and foot angle, among other things. Knowing the distance can also help with resetting the home positon of the motion sensors for accurate 3D tracking (like head tracking for VR glasses with external cameras).

A distance or motion sensor can be used to count jump rope swings. Motion sensors, such as gyroscopes, accelerometers or magnetometers can be utilized for 3D tracking of motion, to determine the angle of shoe stance or other desired shoe position information. In a preferred embodiment, a 9-axis motion sensor that includes a gyroscope, accelerometer and magnetometer is used for sensing motion, such as side to side, up and down, forward and backward, etc. A rep counter can be utilized together with others of the sensors to count reps and to keep a count of good reps and bad reps (e.g., correct form versus incorrect form). The rep counter can be part done by the motion sensor or can be a separate component/sensor. In a preferred embodiment, the system includes a motion monitor for back alignment, which can be integrated into the system for better form monitoring of the user's back alignment during the workouts. In another embodiment, the system can include a camera or cameras and the ability for video monitoring to determine body alignment issues of the user while performing exercises. This can be done using video computer vision to analyze video and image files to determine good versus bad form. This can also be done using external cameras (e.g., GoPro cameras) to get multiple angles (e.g., top, side, top angle, etc.) in the right timing sequence or frame.

Preferred embodiments of the inventive system include an easy calibration mode, where most of the time it is done automatically. However, to improve the weight reading, the preferred system includes three levels of calibration to improve accuracy to what the user is requiring. Not all exercise requires precision weight. With 12 bit ADC the inventive system can get accuracy down to approximately 0.25 lbs for the pressure sensor; however other factors like shoe material and ground floor (mat, sand, dirt, grass, and pavement) will change the read out. In a preferred embodiment, the present invention utilizes GPS and the user profile to determine which offset to use to get the best result of what the user needs.

The present invention includes dynamically deterring the best sampling rate, power usage, hardware usage based on what type of activity the user is doing to improve battery life, including a sensitive motion controller for accuracy to slow foot movement. Home center position monitoring to keep motion controller accuracy on point with foot movement.

In an exemplary embodiment, the footwear and system includes eight pressure sensors using either or both 1,000 lbs or 7,000 lbs sensors, 9-axis gyroscope, accelerometer, magnetometer sensors, detachable coin cell battery (can be used with external rechargeable coin cells), a temperature and humidity sensor (sensors offset), vibration sensor for alerts, Bluetooth BLE (and or Ant+Mix) wireless communication, external memory for data logging when not with the associated phone or when there is a bad wireless connection, and distance sensor(s) and motion sensor(s) for determining shoe distance and jump rope swing counts.

In a preferred embodiment, the system can be integrated with iPhone GPS, iWatch heart rate sensor (other watches too), iPhone health, health records (HL-7 CDA), and RTL-Health. In a preferred embodiment, the present invention includes a dedicated fitness form awareness application or app, the ability to detect motion patterns, such as walking, jumping, hopping, skipping, limping, spinning, sitting, cleans, thruster, box jumps, double under, burpees, push-ups, and squats. Preferably, the system can also learn new movements or patterns, thereby configuring the system to the user's ability. Preferably, the system also includes specific motion for training and repeatability, live/remote coaching, training guide, training reporting, recovery/exercise monitoring, improving athletic/motion abilities, collecting and monitoring statistics of data, sharing data socially or privately, alignment, force/loading, balancing, landing zone, posture, injury prevention, cadence and contact time.

In other preferred embodiments, the system can be supplemented with module sensors. For example, the system can include a motion module that adds more motion points to the body for partial to full body tracking. This can be implemented by including further gyroscopes, accelerometers or magnetometers. For example, this can be used to monitor back alignment head, knee, hand, elbow or other body part positioning for better form monitoring. The system can include a life module for keeping track of various body readings for data analytics for improving and preventing health issues. For example, the module can monitor heart rate, blood pressure and body temperature. This can also be done by adding further gyroscopes, accelerometers or magnetometers. It will be appreciated that all of the added modules, sensors, components, etc. are each or all in wireless (or wired) communication with the portable electronic device and the software application thereon.

The system can also include an air module for measuring the air quality of the surrounding area. This can include monitors for air quality (particle monitor), ozone, oxygen, other gases (e.g., carbon monoxide, carbon dioxide), air pressure and altitude. The system can also include an abuse module or sensor to monitor readings such as sweat, hydration, alcohol intake, nicotine, sugar and GSR. A sensor can be positioned in the shoe(s) or sock(s) and communicated with the app to monitor levels of the things above. A contact sensor that conducts when a user's sweat comes into contact with it and the user's body can be used to take these readings. The system can also include a muscle and/or fat module. This can include 8 (or other number) muscle quality and/or fat percentage sensor pad, 8 (or other number) input Hub, stick pad conductive pads (stick tapes can be replaced), muscle execution for proper form, muscle activity, muscle and fat workout statistics, as well as alerting the user to offsets to balance/weights to correct strength offset. For example, most people are stronger on their right side. The app will help them to correct that to become balanced. The application can also help users to learn about limits and muscle fatigue to prevent injury if a user is pushing too hard. The system can also include a module for measuring body fat percentage and muscle quality, similar to SKULPT®. This module can be incorporated with the back sensor.

In preferred embodiment, the system can be used for measuring the distance between the feet/shoes in an athletic/medical system. This adds accuracy to the motion 9-axis tracking system in each shoe that will allow for accurate tracking between the two left and right feet. Preferably, the system includes a home position for the motion sensors on the shoe wearable devices. This allows the unit to self-center itself to the home zero position to keep the motion movement sensor accurate. The system includes distance sensors on the bottom or sides of the shoe to measure the distance between the left and right shoe. The distance sensor on the shoe can be used to count jump rope swings (e.g., counting single, double or triple swings of the rope before the user lands). When combined with the motion sensors, the system can keep accurate count of the number of successful jump counts and the number of swings. An infrared LED can be used for distance measuring and for jump counts. Radio waves, laser or sonar, x-rays, wi-fi or other sound or light related technologies can also be used.

Preferably, the system includes the ability to determine and count reps of good vs bad form based on foot movement, stance, landing and weight changes. The ability to use sensor(s) to dynamically determine movement patterns specifically for workouts, and then auto recognize activity based on input sensor(s) to determine the workout and good vs bad repetition count. Preferably, the system can learn new motion and balance patterns for new types of workout or can be customized for users with limited physical abilities due to a disability. For example, the system can sense and monitor the proper movement for cleans, thrusters, box jumps, double unders, burpees, squatting, wall balls, and counting the reps based on proper foot movement and form. Additional sensors can be placed on the user's back, chest, arms, and other locations to improve body mechanics of captured movements.

The system also includes a calibration process for the wearable shoes to provide accurate weight measurements. A calibration reading is taken into account before a user inserts their feet into the shoe. The calibration method of using the user's own weight as one reading once inserted, then having the user input their actual measured weight as input or from the database. First, the show is calibrated to zero before the user places their foot inside. Then the user puts on the shoe and inserts their own weight while standing to start calibration. The next step is to account for material offset. This can be done by having the user hold a heavy item (e.g., 50 lbs) to then determine offset weight to determine the material of shoe/insole on a solid surface ground (pavement or tile) offset for sensor(s). Another advanced calibration method is to account for non-solid surface grounds like a mat, carpet or grass. With the calibration method done above, the user then stands on a new softer surface, such as grass, carpet, sand or foam padded floors and uses the mobile app to recalibrate for surface offset to improve accuracy. Using GPS location and surface, auto smart GPS surface location calibration can be used to determine the surface offset during a run or workout. In another method the system can use pressure sensors in the shoe wearable device as a digital scale for weighting items that were picked up, such as weighted bars, luggage, bags, etc. This part of the system can also use GPS (internal or external signal from iPhone or watch) to auto configure the ground profile and improve weight pressure sensor accuracy based on the physical surface. Ground like pavement, sand, dirt, grass, and matted surface will offset the pressure reading from the sensor. An alternative can be based on user selective profile within the application. Using shoe type, insole type, and or material type selector for offsetting sensor calibration for the shoe wearable device. Offset can come from a database of known configurations and new entries from users can also be shared with others.

The system can include a visual way (e.g., on the app) to show visually the proper stance, balance, and landing position all within a single view. For example, the system can show the shooting stance for a gun or the proper starting position for a squat.

When the system monitors a user's bad form it can include either or both of a real (human) coach and or a software alert that alerts the user when they are incorrectly doing something that will lead to bad form or injury. The system can allow for a real human to remotely monitor users to allow for real time feedback. The system can also use a camera on the mobile device within the application with Computer Vision or the like to analyze the user's full body position along with the shoe data to determine good versus bad form.

In a preferred embodiment, the system includes the ability to use sensor(s), database, or user inputs of body size and build such as height, weight, arm length, and leg length, to dynamically modify calibration settings of movements to fit specific user profiles for repeatability of movements for the user's body type. For example in gymnastics sports, based on how tall you are, the movements for a running jump will differ in body position and stride. This algorithm will then determine if motion is correct or incorrect based on body type of specific user.

Preferably, the system includes the ability to measure sweat for (hydration, alcohol, nicotine, and sugar) in a health fitness and health monitoring application. This can be built into the shoe wearable device or as a standalone module that connects to the echo system of sensor data gathering. Preferably, the system includes the ability to measure air quality (ozone, oxygen, $CO_2$, air pressure, altitude) in a health fitness and health monitoring application. This also can be built into the shoe wearable device or can be a standalone module that connects to the echo system of sensor data gathering.

In an exemplary embodiment, the present invention includes the ability to monitor and count reps during exercises such as clean and jerk, deadlift, concept II rowing machine, power clean, push jerk, push press, burpees, knees to elbows, toes to bar, sumo deadlift high pull, squat, back squat, front squat, overhead, overhead squat, snatch, Turkish get-up, hang squat clean, chest to bar pull ups, vertical jumps, double under jump ropes, single jump ropes, sumo deadlift high pull, split jerk, thrusters, box jumps, walking lunges, pistols, running, walking, sprinting, jumping, kettlebell, pull-ups, push-ups, muscle ups, bench press, dumbbells, sit-ups, hand stands, hand stand push-ups, rowing, glute ham raises, back extensions, air squats, over heads, hip extensions, hallow rock, rope climb and ring dips.

BRIEF DESCRIPTION OF THE DRAWINGS

The invention may be more readily understood by referring to the accompanying drawings in which:

FIG. 5 is a top plan view of a pair of shoes showing distance detection;

FIG. 6 is a top plan view of a pair of shoes showing angle detection;

Like numerals refer to like parts throughout the several views of the drawings.

DETAILED DESCRIPTION OF THE PREFERRED EMBODIMENTS

Figure 1:
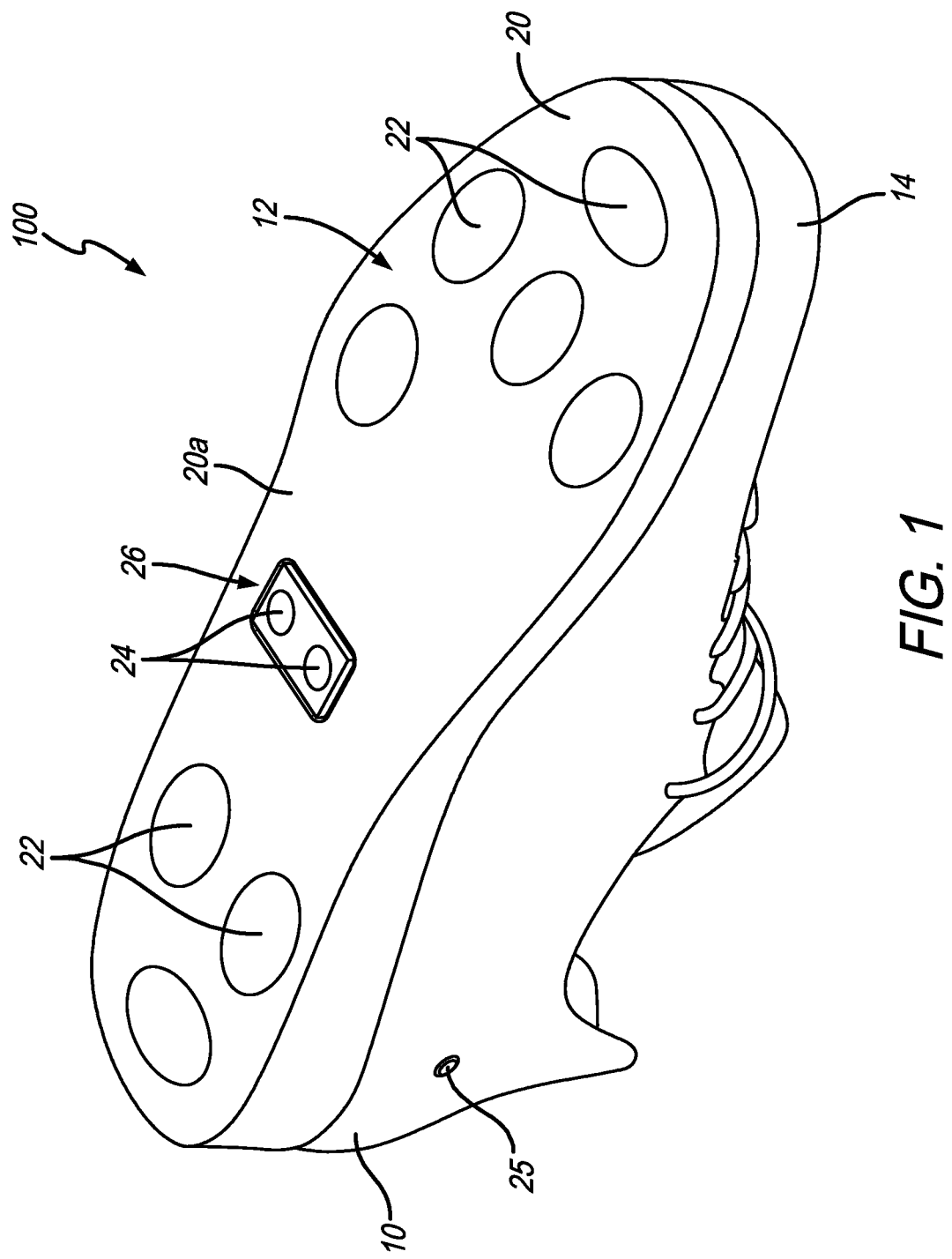
FIG. 1 is a perspective view of a shoe including a sensor system in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Some of the drawings herein and the following discussion are intended to provide a brief, general description of a suitable computing environment in which the subject matter disclosed herein may be implemented. Although not required, aspects of a system and method for sharing location information in a networked computing environment will be described in the general context of computer-executable instructions, such as program modules, being executed by a personal computer and/or computer-readable media on which such instructions are stored. Generally, program modules include routines, programs, objects, components, data structures, etc., that perform particular tasks or implement particular abstract data types. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Some of the drawings herein and the following discussion are intended to provide a brief, general description of a suitable computing environment in which at least a portion of the subject matter disclosed herein may be implemented. Although not required, aspects of a system and method for loss recovery or loss prevention, a portion of which takes place in a networked computing environment, will be described in the general context of computer-executable instructions, such as program modules, being executed by a personal computer and/or computer-readable media on which such instructions are stored. Generally, program modules include routines, programs, objects, components, data structures, etc., that perform particular tasks or implement particular abstract data types. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to the drawings, wherein the showings are for purposes of illustrating the present invention and not for purposes of limiting the same, FIGS. 1-10C show a footwear system 100 that includes at least one and preferably a pair of shoes 10 (left and right shoes) having a sensor system 12 incorporated therein. Generally, each shoe 10 includes an upper 14, an insole 16, a midsole 18 and an outsole 20 (see FIG. 2).

The shoes will be described first. For description purposes, the shoes are divided into four regions between the heel and the toes; the toe region 21a, the forefoot region 21b, the arch region 21c and the heel region 21d. As shown FIG. 1, the sensor system 12 includes a plurality of pressure sensors 22 that are positioned in at least some of the regions 21a-21d described above. The pressure sensors 22 can be positioned on a printed circuit board or the like or otherwise sandwiched between the insole and outsole or they can be positioned such that they extend downwardly from or are otherwise exposed through the bottom surface 20a of the outsole 20. In another embodiment, the sensors 22 can be positioned between any of the various components of the shoe, such as between the insole 16 and outsole 20 or midsole 18 or on top of the insole. Any position where meaningful pressure and weight readings can be taken is within the scope of the present invention. The sensors 22 preferably can measure pressure and weight and help with balance.

Figures 4A, 4B:
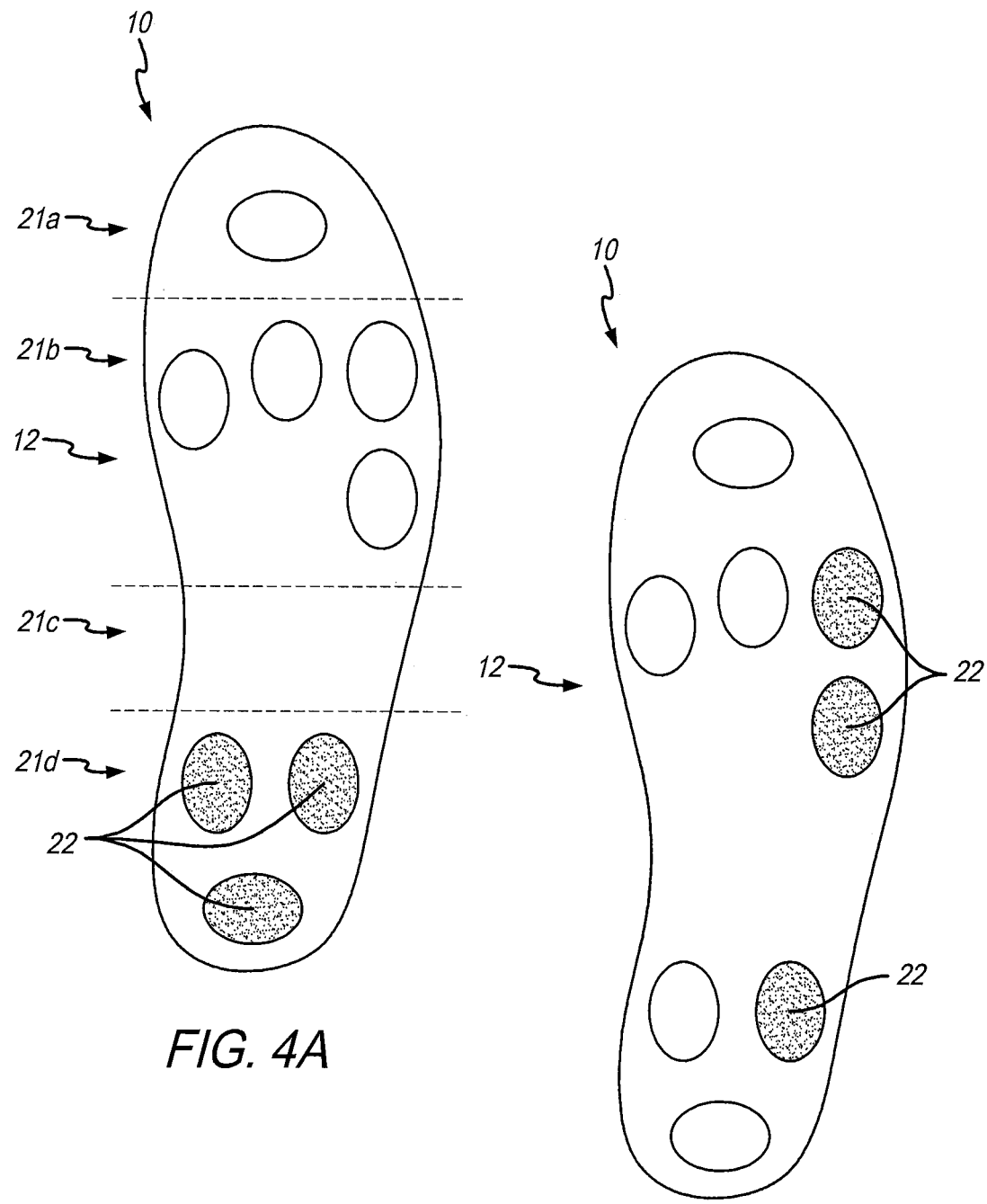
FIGS. 4A-4F are schematic bottom plan views of the shoe bottom showing various sensors activated.
Figures 4C, 4D:
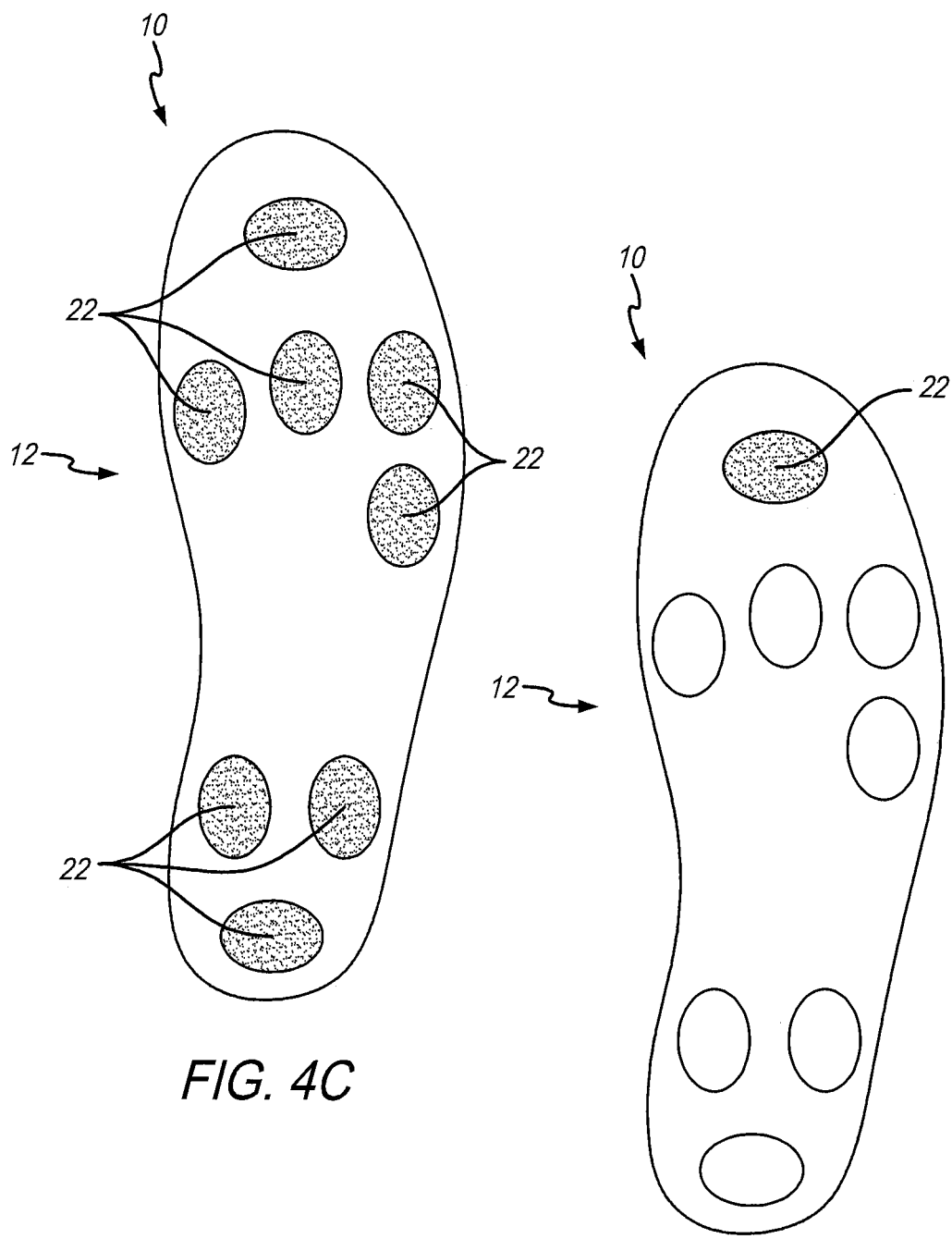
Figures 4E, 4F:
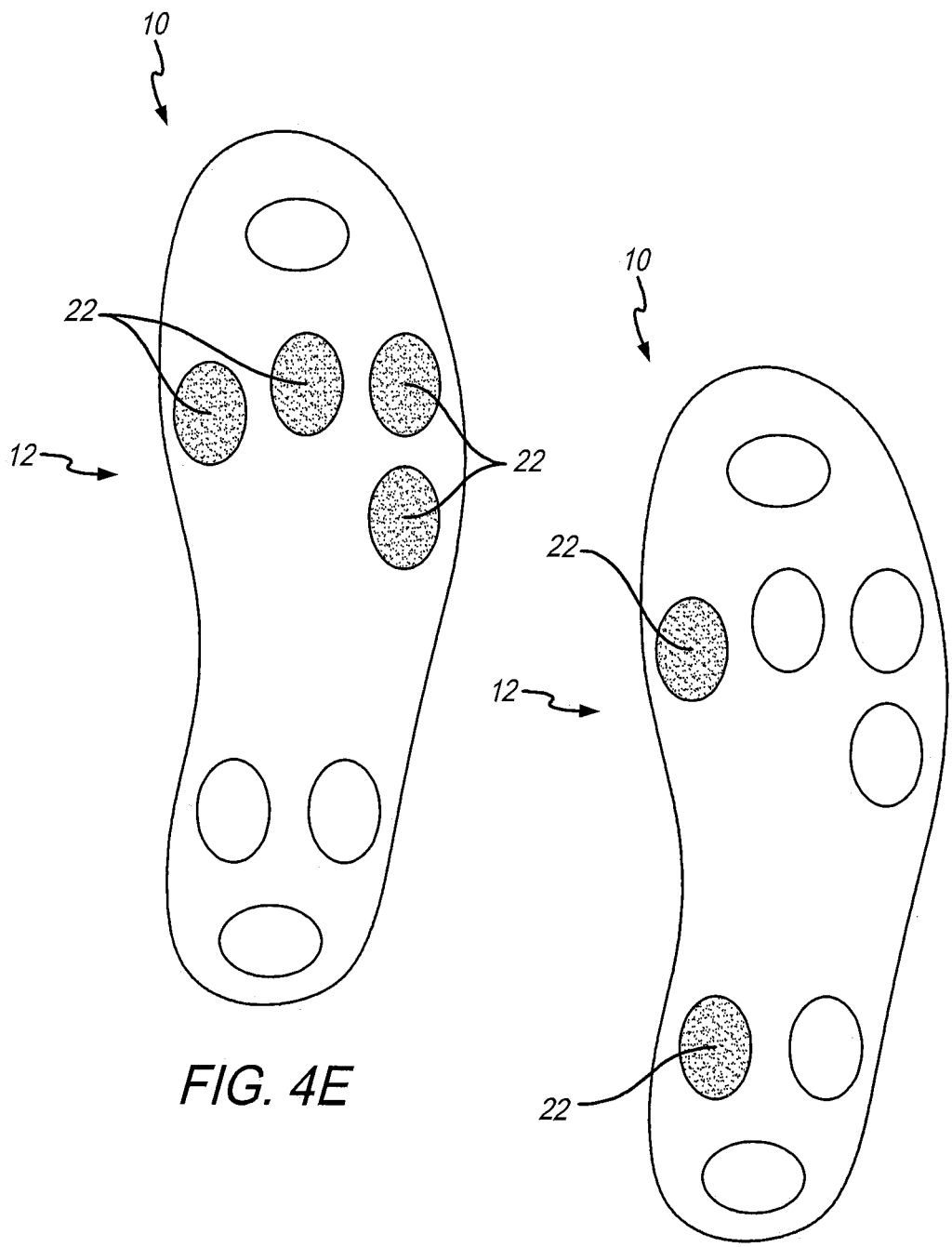

In a preferred embodiment, the sensor system 12 includes groups of pressure sensors that sense when a user is placing pressure or weight on a certain area of the shoe 10 or outsole 20. For example, the shoe 10 can include single sensors or groups of sensors that indicate when pressure or weight (and how much weight) is placed on the toe section, the heel section, the lateral section, the medial section, the metatarsal region or the arch region. For example, FIG. 4A shows a heel group of sensors 22 in stippling (to indicate the wearer is placing weight on the heel portion of the foot), FIG. 4B shows a lateral group of sensors 22 in stippling (to indicate the wearer is placing weight on the lateral or outer portion of the foot), FIG. 4C shows all of the sensors 22 in stippling (to indicate that the wearer is placing weight generally evenly on all portions of the foot), FIG. 4D shows a toe group of sensors 22 in stippling (to indicate the wearer is placing weight on the toe portion of the foot), FIG. 4E shows a forefoot group of sensors 22 in stippling (to indicate the wearer is placing weight on the forefoot, ball or metatarsal portion of the foot), and FIG. 4F shows a medial group of sensors 22 in stippling (to indicate the wearer is placing weight on the medial or inner portion of the foot). It will be appreciated that a "group" can comprise a single sensor and that a group can also be referred to herein as a zone. It will also be appreciated that a sensor can be part of more than one group. For example, as shown in FIGS. 4A and 4B there is a sensor 22 in the heel group that is also part of the lateral group. In a preferred embodiment, the sensor system 12 includes at least four sensors 22, and in other embodiments between four and eight or more than eight contact sensors can be used to receive meaningful readings across the foot. The sensor groups or zones inform the system where the user is placing or positioning their weight or where they are landing when placing the foot on the ground during an exercise. For example, if a user jumps and lands on their heels, the heel group or zone will sense this impact and communicate this to the app.

The sensors 22 can be used to accurately calculate step count and/or weight, which can be combined with motion to determine the specific type of movement. The sensor system 12 can also include one or more non-pressure based motion sensors 24 to count or calculate step count or jumps when performing activities such as jump rope or box jumps. The motion based sensors can also be embedded elsewhere in the shoe or placed on the microcontroller or electronics assembly 26 and can be used to determine angle, and other motions. In a preferred embodiment, at least one of the shoes 10 includes a distance sensor 25 on the side thereof to determine the distance between the two shoes 10. As discussed herein, knowing the distance between the shoes provides information related to stance and foot positioning. In another embodiment, sensors can be positioned inside of the shoe, for example, on the top surface of the insole to provide further feedback to the system for determining the wearer's foot positioning, weight, foot placement, weight distribution, etc.

Figure 2:
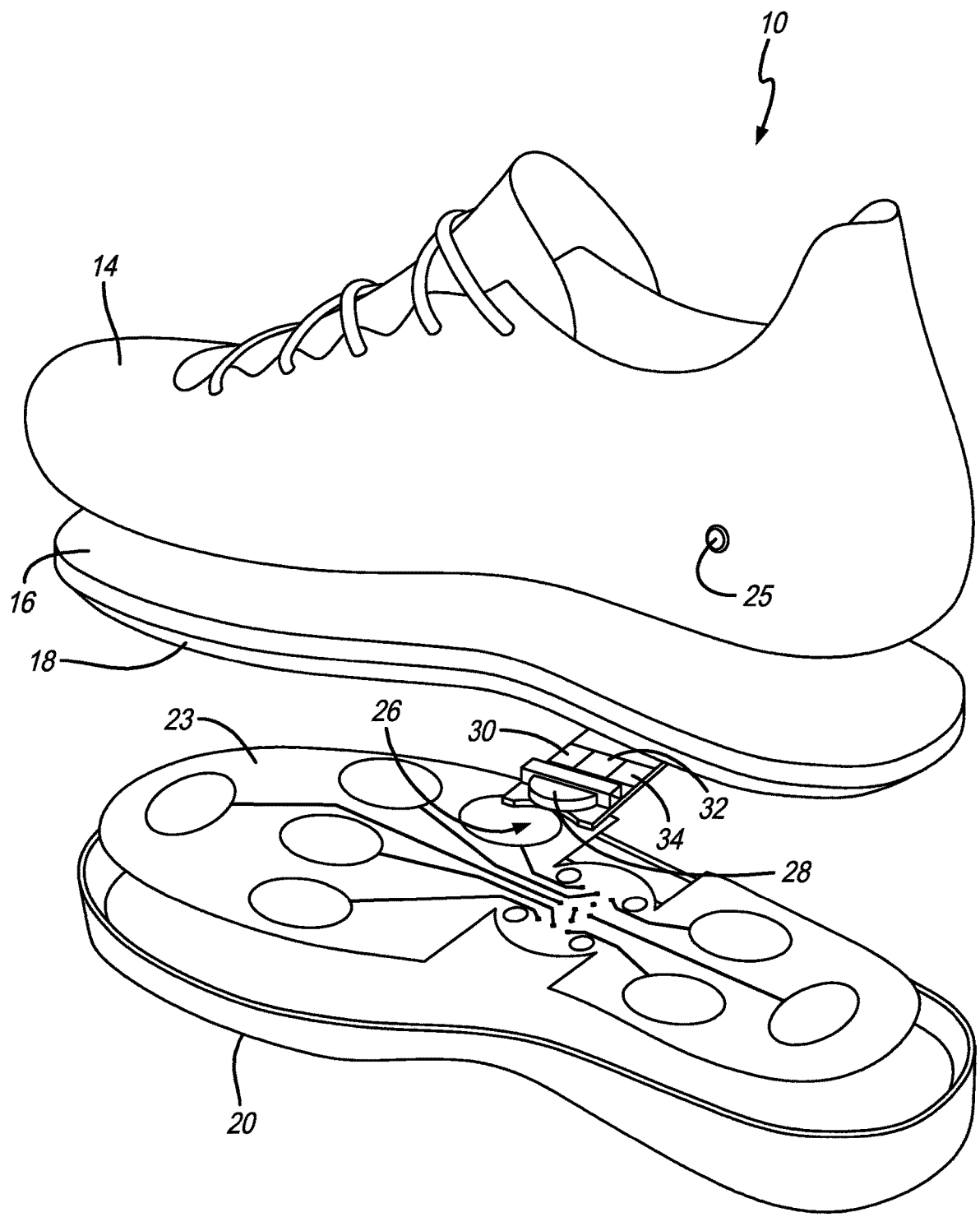
FIG. 2 is an exploded perspective view of the show of FIG. 1.
Figure 3:
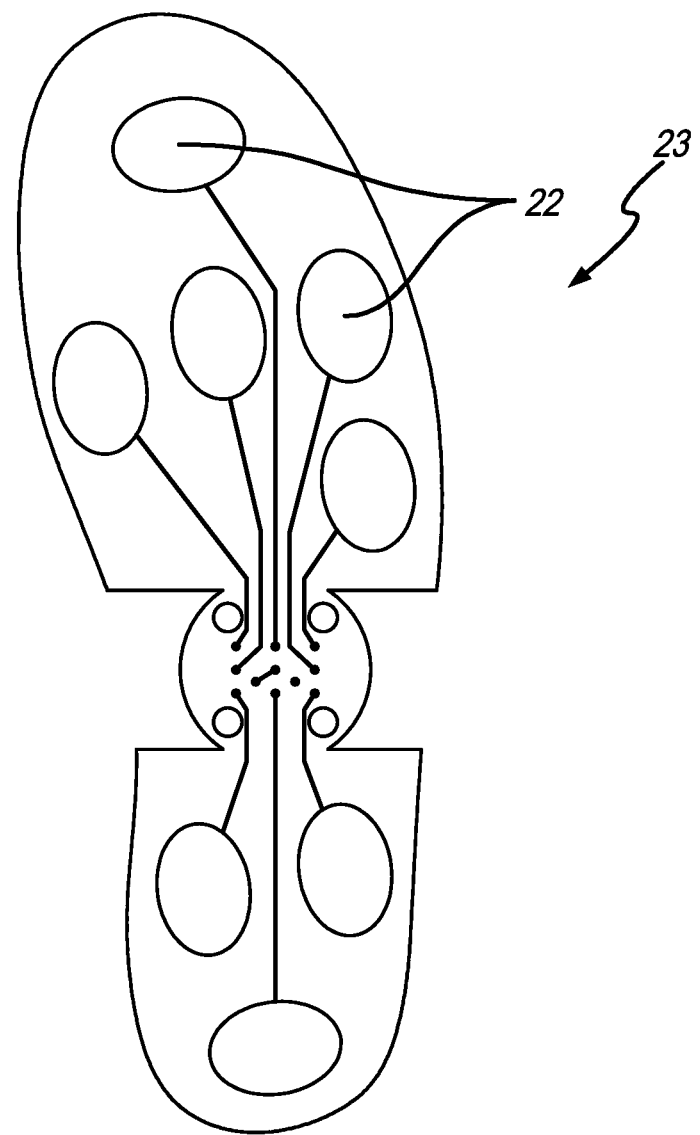
FIG. 3 is a plan view of a sensor assembly in accordance with a preferred embodiment of the present invention.

As shown in FIG. 3, each of the sensors 22 can be positioned or mounted on a circuit board, thin film or sensor assembly 23 that allows them to be positioned between different components in the show (e.g., between the midsole/insole and the outsole). The sensors 22 are in electrical communication with a motherboard, microcontroller or electronics assembly 26 that includes many of the electronic components of the invention (as shown in FIG. 2). The sensors 22, 24 or 25 can be one or more of pressure sensors, 9-axis gyroscopes, accelerometers, magnetometer sensors, infrared sensors or the like. It will be appreciated that the term sensor is used interchangeably throughout the disclosure and any one sensor described herein can be replaced with another type of sensor described herein. The electronics assembly 26 preferably includes a power source. For example, the shoe 10 can include a replaceable battery 28 (e.g., coin cell battery) or a rechargeable battery (can be used with external rechargeable coin cells). The electronics assembly 26 also preferably includes a vibration component, assembly or member 30 that vibrates to provide notifications to the wearer, a transmitter/receiver or other wireless communication device or component 32 for connecting to and communicating with the user mobile device 110 (e.g., Bluetooth BLE and or Ant+Mix), and a memory unit 34 for data logging when not connected to user mobile device 110 or when there is a bad wireless connection, and a distance sensor for determining shoe distance and jump rope swing counts. It will be appreciated that the components of the electronics assembly 26 described herein can be encompassed in a single unit or assembly or can be disposed or positioned in different locations on or throughout the shoe 10 and/or the various parts of the shoe, such as the upper 14, insole 16, midsole 18 or outsole 20. For example, FIG. 2 shows an electronics assembly 26 that is centralized. However, the components can be distributed throughout the shoe 10.

Figure 8:
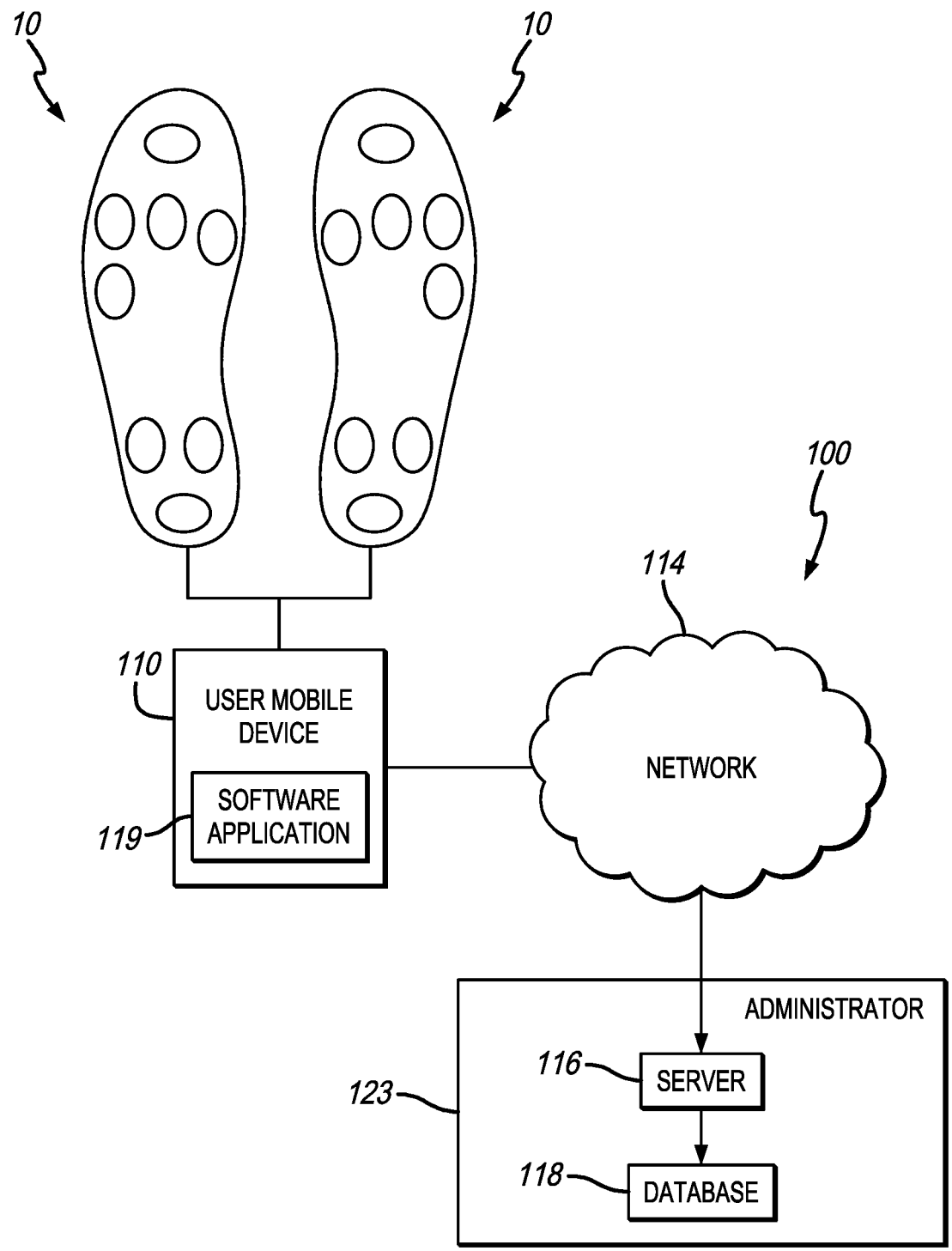
FIG. 8 is a diagram showing a networked computing environment that allows implementation of the methods and systems disclosed herein.

With reference to FIG. 8, a preferred embodiment of the footwear system 100 described in the context of an exemplary computer network system illustrated. System 100 includes a user mobile device 110 as part of the system. As described herein, the first user mobile device 110 is in communication with the shoe(s) 10 (e.g., via Bluetooth or the like). The user mobile device 110 is, for example, a cellular or mobile telephone, smart watch, tablet, laptop or desktop computer, smart television or the like, that is linked via a communication medium, such as a network 114 (e.g., the Internet), to an electronic device or system, such as a server 116, that is part of an administrator system 123. It will be appreciated that this essentially means that the components in box 123 in FIG. 8 are part of a system operated by the company that owns or administers the software application 119 to users. However, this is not a limitation on the present invention. In a preferred embodiment, the user mobile device 110 includes a source client or software application 119 running thereon. The server 116 may further be coupled, or otherwise have access, to a database 118 or databases and other components, such as electronic storage, and computer systems (not shown). It will be appreciated that the database 118 is configured to store account information for all the users who are registered with the system. The database 118 (or a separate database) can also include all of the workout or exercise information thereon. Although the embodiment illustrated in FIG. 8 includes a single server 116 coupled to two user mobile device 110 via the network 114, it should be recognized that, as described herein, embodiments of the invention may be implemented using two or more such user mobile devices coupled to one or more such servers. Moreover, the network 114 may include or otherwise be coupled to one or more telecommunication towers that provide network connectivity to the user mobile devices. In an embodiment, the shoe 10 can include the ability to connect to the network 114.

It should be understood that first user mobile device 110 includes or is otherwise coupled to a computer screen or display. First user mobile device 110 can be used for various purposes including both network and local computing processes. The first user device 110 is linked via the network 114 to server 116 so that software programs, such as, for example, a browser or other applications, running on the first user device 110 can cooperate in two-way communication with server 116. Server 116 may be coupled to database 118 and/or electronic storage to retrieve information therefrom and to store information thereto. Moreover, the server 116 may communicate with the first user device 110 and/or GPS/triangulation systems known in the art in such manner as to allow the server 116, using map data stored in the database 118 or elsewhere, to generate location data, such as, for example, HTML data, that may be used by a browser or similar application to display the location of the first user mobile device 110. Additionally, the server 116 may be coupled to the computer system in a manner allowing the server to delegate certain processing functions to the computer system. Accordingly, it should be understood that when reference is made herein to the server 116 performing a function, the server 116 not actually be performing the function, but may delegate it to a separate computer system. The system includes a computer-readable, non-transitory medium including instructions that, when executed by a source device in cooperation with the server, enables the monitoring of a workout performed by a user wearing a shoe that includes a sensor system therein that is in communication with the source device.

In a preferred embodiment, both left and right shoes include similar electronics assemblies 26 and each communicate directly with the user mobile device 110. However, in another embodiment, the shoes are in wireless communication with one another and only one shoe communicates with the user mobile device 110.

In a preferred embodiment, the system 100 alerts or notifies the user when they are doing an exercise incorrectly, can learn new motion and balance patterns or routines for new types of workout or can customize routines based on a user's limited physical abilities or for other purposes. The system 100 can use the motions and patterns to dynamically determine what type of movement the user is doing to keep count of that motion, e.g., running, jumping, spinning, sitting, balancing heavy weight above the user's head. The system 100 can sense the difference between each motion in order to keep track of good and bad reps, and then switch to a new motion to keep track of it while keeping track of the entire workout. The proper form is also based on the each user's body profile; for example, different users will have longer legs or wider hip widths. With each user's body profile information, the system can better determine the proper form calculations.

For example, for box jumps, if the user has informed the system 100 that they are doing box jumps, the system knows (based on information stored in the database) that the proper form is to land on the heels when coming off of the box. Therefore, if the user lands on their toes, thereby activating the sensors 22 in the toe, forefoot or metatarsal regions, the system will notify the user that they are performing the exercise incorrectly. The notification can be one or more of a vibration or sound in the shoe 10, a vibration or sound on the user's portable electronic device (or in their headphones), a text notification, app alert notification, etc. Furthermore, if the user performs multiple box jumps, the system can count how many were performed correctly, and how many were performed incorrectly. Furthermore, in a preferred embodiment, the system can also determine that the user is using both feet properly. For example, in landing from a box jump, the system can sense whether the user is landing properly with approximately equal weight distribution for both feet. It will be appreciated by those of ordinary skill in the art that the vibrations provided in the shoe can be different for different notifications. Longer vibrations (i.e., a dash), and shorter vibrations (i.e., a dot) or combinations thereof can be used to indicate different notifications. For example, a dot can be used to indicate proper form and a dash can be used to indicate improper form. Other notifications can be provided by the vibrations, e.g., for Bluetooth connection, on, off, etc.

Figure 7:
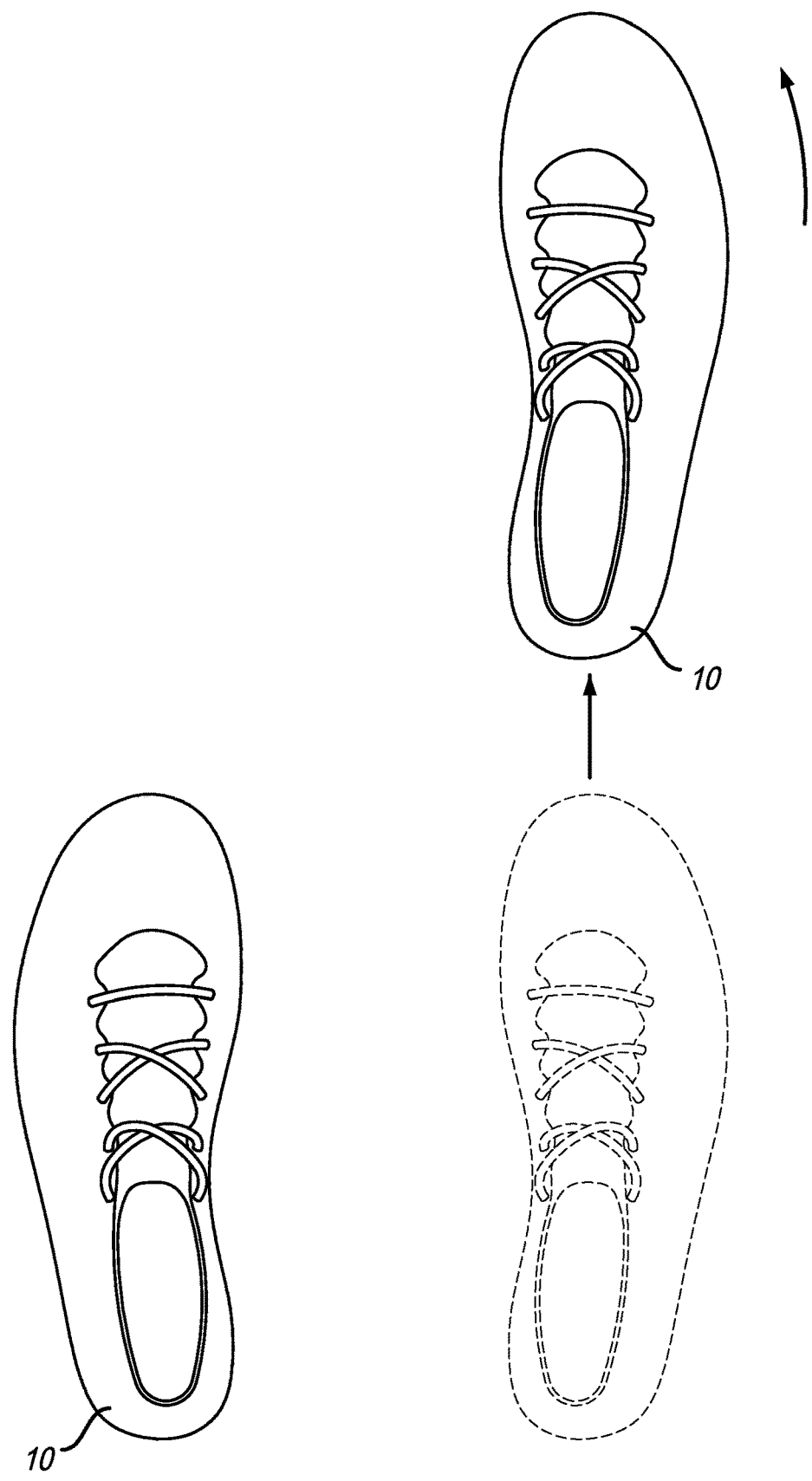
FIG. 7 is a top plan view of a pair of shoes showing forward and back foot positioning detection.

FIGS. 5-7 show examples of detecting foot positioning by the use of one or more of the sensors 22, 24 and/or 25. FIG. 5 shows an example where the sensors are sensing the distance between shoes 10. FIG. 6 shows an example where the sensors are sensing the angle of the pair of shoes. FIG. 7 shows an example where the sensors are sensing the positioning of the shoes 10 forwardly and backwardly from one another. It will be appreciated that for most exercises the sensors will be sensing more than one of these movements (distance between shoes, angle of shoes and forward and/or backward positioning relative to one another).

Figure 9A:
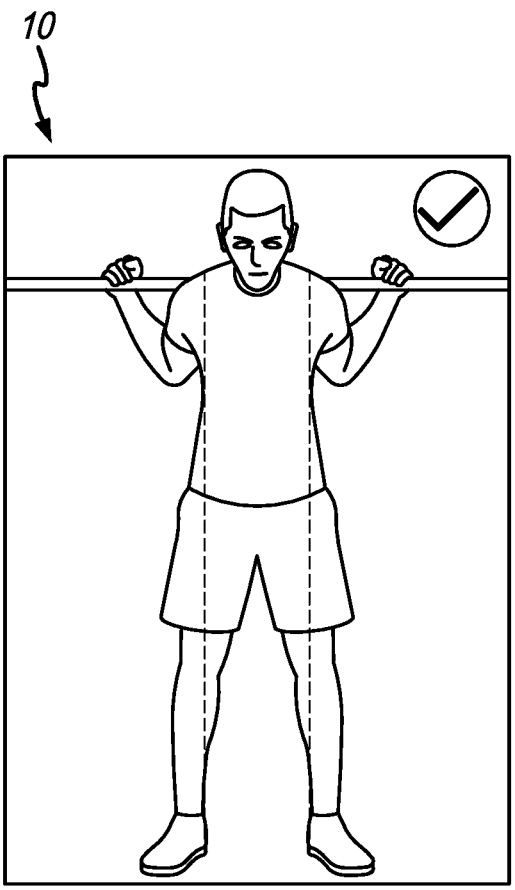
FIG. 9A shows an example of the distance sensor sensing the proper distance between shoes during a squat.
Figure 9B:
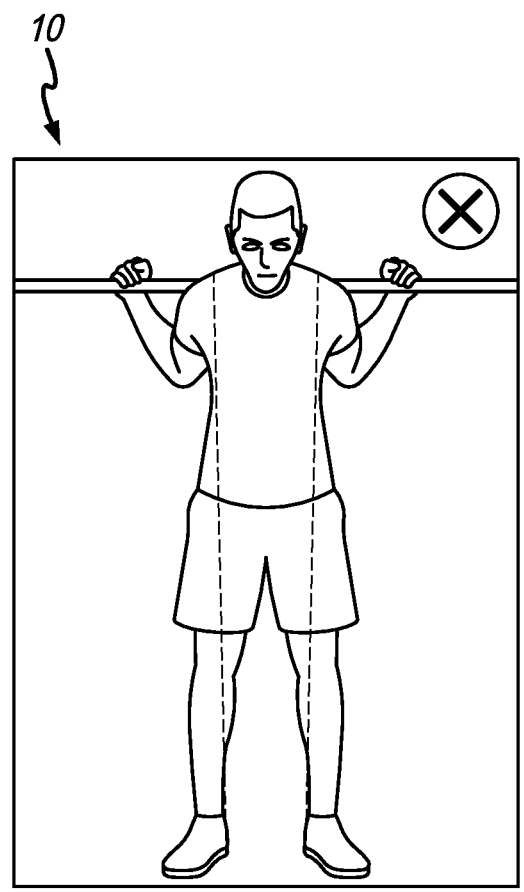
FIG. 9B shows an example of the distance sensor sensing an improper distance between shoes during a squat (feet too close to one another)
Figure 9C:
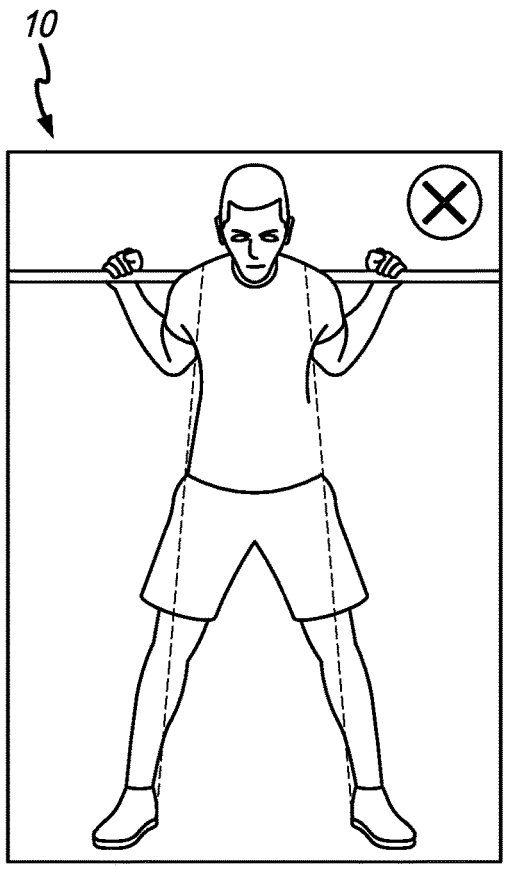
FIG. 9C shows an example of the distance sensor sensing an improper distance between shoes during a squat (feet too far apart)
Figure 10A:
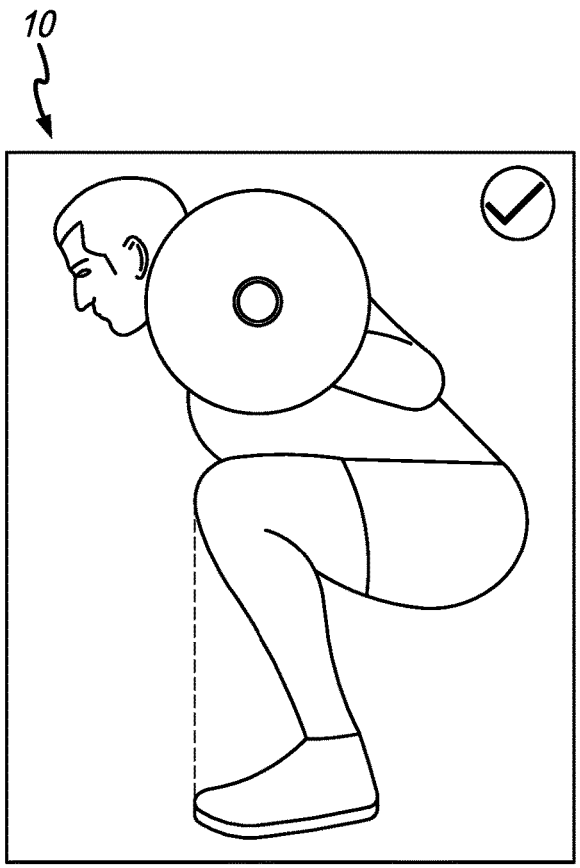
FIG. 10A shows an example of the weight sensors sensing the proper positioning of the shoes during a squat.
Figure 10B:
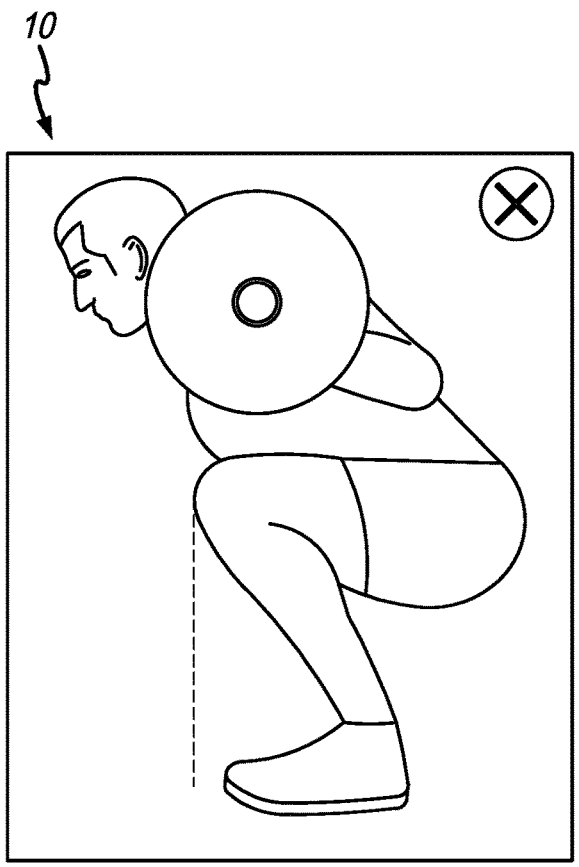
FIG. 10B shows an example of the weight sensors sensing an improper positioning of the shoes during a squat (feet positioned too far back from the knees)
Figure 10C:
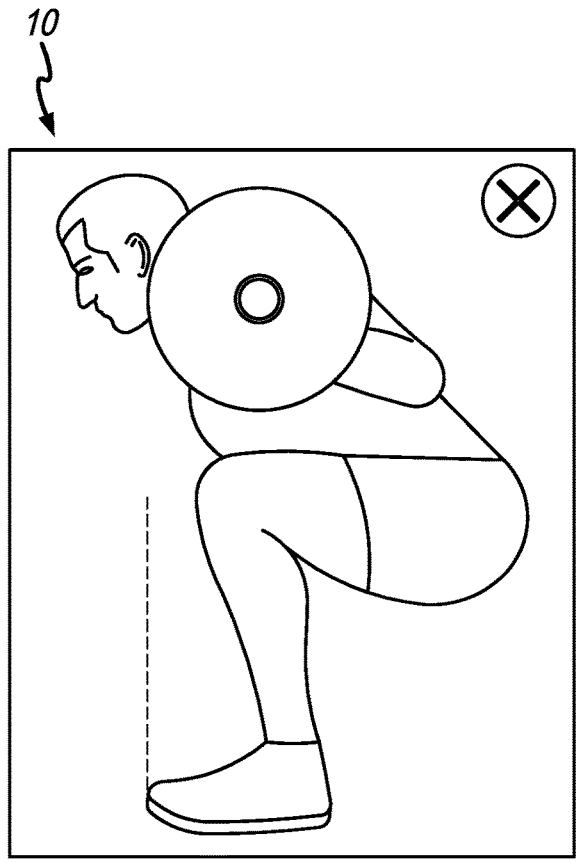
FIG. 10C shows an example of the weight sensors sensing an improper positioning of the shoes during a squat (feet positioned too far forward of the knees).

For example, sensing the distance between shoes is used, for example, for air squats, front squats, back squats, overhead squats, box jumps, walking and overhead lunges, jumping rope, kettlebell swings, medicine ball cleans, wall balls, sumo deadlift high pulls, deadlifts, shoulder and push presses, push jerks, power and squat snatches, split jerks, burpees, power and squat cleans, thrusters, ring rows, hallow rocks, hip and back extensions and sit ups. See also FIGS. 9A-9C, which show proper distance between feet for a squat (FIG. 9A), and improper distance between feet for a squat (FIGS. 9B and 9C).

Foot angle sensing can be used, for example, for air squats, front squats, back squats, overhead squats, box jumps, walking and overhead lunges, jumping rope, kettlebell swings, medicine ball cleans, wall balls, sumo deadlift high pulls, deadlifts, shoulder and push presses, push jerks, power and squat snatches, split jerks, burpees, power and squat cleans, thrusters, muscle up bars, muscle up rings, ring rows, ring dips and sit ups. For example, if a user is performing an exercise, such as a squat, where there feet should be angled outwardly, but are actually angled inwardly, the user will be notified. The notification may be a vibration in the shoe, which causes the user to look at their phone, which can notify them they are performing the exercise improperly and then informing them how to perform the exercise properly. FIG. 7 shows an example where the sensors are sensing the positioning of the shoes 10 forwardly and backwardly from one another. This can be useful, for example, for performing split jerks, and can count reps (e.g., via sensors 24) and sense whether foot placement is proper (e.g., via sensors 22). It can also be useful for pull-ups, handstands, handstand push-ups, ring dips, knees to elbows, toes to bars, box jumps, pistols, jumping rope, power and squat snatches, split jerks, burpees, muscle up bars, muscle up rings, ring rows, ring dips, hallow rocks, hip and back extensions, rope climbs and sit ups. It will be appreciated that many of the exercises and motions use a combination of what is shown in FIGS. 5-7.

The sensors shown in FIGS. 4A-4F can be used for air squats, front squats, back squats, overhead squats, pull-ups (improper landing), box jumps, pistols, walking and overhead lunges, jumping rope, kettlebell swings, medicine ball cleans, wall balls, sumo deadlift high pulls, deadlifts, shoulder and push presses, push jerks, power and squat snatches, split jerks, burpees, power and squat cleans, thrusters, ring rows, muscle up bars, muscle up rings, ring dips, rope climb, bench press and rows. See also FIGS. 9A-9C, which show proper distance between shoes 10 for a squat (FIG. 9A—note the check mark notification in the top right corner), and improper distance between shoes 10 for a squat (FIGS. 9B and 9C—note the "x" notification in the top right corner). See also FIGS. 10A-10C, which show proper positioning of a user's feet compared to their knees while performing a squat (FIG. 10A—note the check mark notification in the top right corner), and improper positioning of a user's feet compared to their knees while performing a squat (FIGS. 10B and 10C—note the "x" notification in the top right corner). These are both determined by where the weight is placed on the user's feet (and in which zone(s) or group(s)).

It should be understood that the present invention provides a user the capability of connecting a shoe or pair of shoes with a software application running on a computer device such as a mobile telephone. Based on the description herein a person of ordinary skill in the art will be able to make and use the invention regardless of the exact description herein. Any type of network connection between the computer devices is within the scope of the present invention. For example, the connection can be made over a cellular network, the Internet, via Wi-Fi or the like.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A footwear system comprising:
a left shoe that includes a left toe region, left forefoot region, a left arch region and a left heel region, a left outsole, a left upper secured to the left outsole, and a left sensor system that includes at least a first left heel pressure sensor positioned in the left heel region, at least a first left toe pressure sensor positioned in the left toe region, wherein the left sensor system includes a left motion sensor, wherein the left shoe includes a left medial side and a left lateral side,
a right shoe that includes a right toe region, a right forefoot region, a right arch region and a right heel region, a right outsole, a right upper secured to the right outsole, and a right sensor system that includes at least a first right heel pressure sensor positioned in the right heel region, at least a first right toe pressure sensor positioned in the right toe region, wherein the right sensor system includes a right motion sensor, wherein the right shoe includes a right medial side and a right lateral side,
a distance sensor positioned on at least one of the left or right medial sides, wherein the distance sensor is configured to determine the distance between the left shoe and the right shoe, and wherein the distance sensor is configured to determine an angle between the left shoe and the right shoe,
wherein at least one of the left or the right shoe includes a wireless communication device, wherein the wireless communications device is configured to wirelessly communicate data from one or both of the left and right sensor systems, wherein at least one of the left or the right shoe includes an electronics assembly that comprises the wireless communication device and a memory unit,
wherein at least one of the left and right sensor systems includes a foot positioning sensor, wherein the foot positioning sensor is configured to determine forward and backward positioning of the left shoe with respect to the right shoe, wherein the footwear system is configured to provide a notification if one of the angle between the left shoe and the right shoe or the forward and backward positioning of the left shoe with respect to the right shoe is not proper compared to proper exercise performance data, and wherein the notification is at least one of a vibration or an audible sound.

2. The footwear system of claim 1 wherein the first left heel pressure sensor and the first left forefoot pressure sensor are mounted on a left sensor assembly that is positioned between a left insole and the left outsole, and wherein the first right heel pressure sensor and the first right forefoot pressure sensor are mounted on a right sensor assembly that is positioned between a right insole and the right outsole.

3. The footwear system of claim 2 wherein the left sensor system also includes at least a first right forefoot pressure sensor positioned in the right forefoot region, and wherein the right sensor system also includes at least a first right forefoot pressure sensor positioned in the right forefoot region.

* * * * *